April 10, 1951 A. G. EMSLIE 2,548,779

MOVING TARGET INDICATION RADAR SYSTEM

Filed Oct. 19, 1945

INVENTOR.
ALFRED G. EMSLIE

BY William D. Hall

ATTORNEY

Patented Apr. 10, 1951 2,548,779

UNITED STATES PATENT OFFICE 2,548,779

MOVING TARGET INDICATION RADAR SYSTEM

Alfred G. Emslie, Boston, Mass., assignor, by mesne assignments, to the United States of America as represented by the Secretary of War Application October 19, 1945, Serial No. 623,396

6 Claims. (Cl. 343—9)

The present invention relates to a radio receiver, and it relates more particularly to an improved limiting type receiver used in radio object locating systems.

Several radio object locating systems have been developed which are adapted to distinguish moving objects from stationary objects. In general, such systems are called MTI (moving target indicating) systems. All systems of this general character are based upon some method for obtaining reference oscillations synchronized in fixed phase with respect to transmitted short duration high carrier frequency exploratory pulses of radiant energy. Echo pulses returned from objects are received and combined with said reference oscillations, and video pulses are obtained from the resulting combination.

The amplitude of the video pulses obtained is a function of the relative phase between the reference oscillations and the returning echo pulses. Fixed objects reflect successive echo pulses which always have the same phase relation with respect to the reference oscillations and hence are evidenced by video pulses having a constant amplitude. Moving objects, on the other hand, reflect successive echo pulses having a progressive phase shift with respect to the reference oscillations and hence are evidenced by video pulses having cyclical variation in amplitude. A system of this general character is more fully described in a copending application of Robert H. Dicke, entitled Communication System, Serial No. 590,052, filed April 24, 1945, Patent No. 2,535,274, granted December 26, 1950.

Although, theoretically, video pulses manifesting stationary objects are non-varying in amplitude, they actually vary to a certain degree. These fluctuations in amplitude are undesirable as they cause the video pulses manifesting stationary objects to have certain characteristics of video pulses manifesting moving objects and hence provide false information. Some of the undesired fluctuations are caused by noise in the receiver, and the amplitude of this noise is independent of the size of the received echo pulses. Other fluctuations are percentage-wise in character and hence vary with the size of the received echo pulses.

A limiting receiver, the details of which are more fully described in a copending application of Alfred G. Emslie, entitled Radio Receiver, Serial No. 623,397, filed October 19, 1945, reduces the undesirable percentage-wise fluctuations to a value equal to or less than a predeterminable amplitude, and in operation the receiver is adjusted so that the predeterminable amplitude and noise level are made substantially equal. As a result, the undesired fluctuations do not appear above the noise level on the indicator, and hence do not provide a false indication of a moving target.

Received echo pulses which have undesired fluctuations have both a phase and amplitude modulation. The above referred to receiver in limiting the amplitude of the received signals leaves only signals having a phase modulation which is independent of the size of the returned echo. This phase modulated (constant amplitude) signal is then combined with fixed phase reference oscillations to provide a resultant signal which has both phase and amplitude modulation. As fully described in the above referred to copending application, the undesired phase change is caused by a number of factors such as slight movements of the stationary object that may be caused by wind, etc., or it may be caused by the scanning of the directional beam over a large object. This limited signal is then detected, thereby losing its phase significance and remaining only as an amplitude modulated signal, the amount of amplitude modulation being independent of the amplitude of the original received (non-limited) echo pulses.

The limited signal when combined with the reference oscillations provides a resultant signal having a pulse to pulse variation in amplitude. When the phase angle ($\alpha$) between the limited signals and the reference oscillations has certain values, difficulty is encountered in detecting certain moving objects and these regions are called "blind" regions or "blind" spots. There are two major factors causing the phase angles of received echo pulses to be in blind regions. One is due to the fact that for certain aircraft speeds (blind speeds) the phase angle between successive echo pulses and the reference oscillations is nearly always in the blind regions. The second factor is due to the fact that under certain conditions the echo signal received at the radio object locating system consists of two components; one being from a moving aircraft (or other moving object), the other being from relatively large fixed objects at the same range. Both factors are more fully described hereinafter.

The effect of these so-called blind phase angle regions is that the pulse to pulse amplitude variations of the video signals manifesting certain moving objects is less than the undesirable amplitude fluctuations of pulses manifesting stationary objects. As a result, the desirable fluctuations (indicating moving objects) do not appear above the noise level of the receiver and certain moving objects remain undetected.

It is therefore an object of the present invention to provide an improved limiting receiver wherein blind spots are substantially eliminated.

It is another object of the present invention to provide a limiting receiver wherein the amplitude rate of change of the output signal is substantially independent of the phase angle between the signal and the reference oscillations.

It is a still further object of the present invention to provide a limiting receiver wherein the limited signals are combined simultaneously with two sets of reference oscillations each being 180° out of phase with respect to each other.

The invention, however, will be more fully understood from the following detailed description when taken into consideration with the accompany drawing, wherein.

Prior to a complete analysis of the factors causing "blind spots" and a complete theoretical explanation of the means used to overcome them, a receiver of the character contemplated will be described. A complete analysis of its operation will follow.

Figure 1:
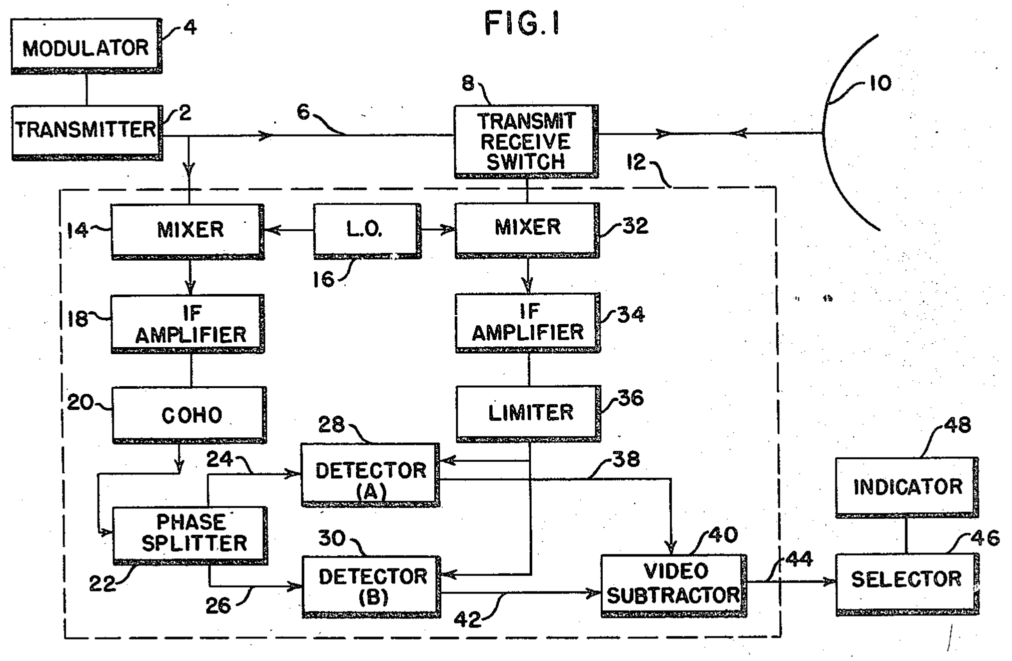
Fig. 1 is a schematic diagram in block form of one embodiment of the present invention.

Reference is made to Fig. 1 which shows one embodiment of the present invention employed in a radio object locating system of the character described. Issuing from transmitter 2 which is actuated by modulator 4 are short duration high carrier frequency exploratory pulses of radiant energy. These exploratory pulses are carried by transmission means 6 through transmit-receive switch 8 to directional antenna 10 where they are radiated into space in the form of a highly directional beam.

Transmit-receive switch 8 serves to connect transmitter 2 to directional antenna 10 during the transmission of exploratory pulses and to disconnect a portion of receiver 12. During the interval between transmitted pulses, and while echo pulses are being received, these connections are reversed and directional antenna 10 is disconnected from transmitter 2 and is connected to receiver 12.

A portion of each exploratory pulse from transmitter 2 is applied to mixer 14, a second input to mixer 14 consisting of continuous wave oscillations from local oscillator 16. The beat frequency output of mixer 14 comprises synchronizing (locking) pulses of radiant energy having an intermediate frequency characteristic. These synchronizing pulses are then amplified by intermediate frequency amplifier 18 and thence applied to coho (coherent oscillator) 20, where they serve to lock the output of said oscillator into a fixed phase relationship with each exploratory pulse. The reference oscillations issuing as an output from coho 20 have a frequency substantially equal to said intermediate frequency and they may be applied to phase splitter 22, the output therefrom comprising two sets of reference oscillations; one taken through connection 24, the other through connection 26. Each set of reference oscillations is 180° out of phase with respect to each other, and the sets are fed respectively to detector 28 and detector 30.

Object returned echo pulses are received at directional antenna 10 and fed through transmit-receive switch 8 to mixer 32. A second input to mixer 32 consists of continuous wave oscillations which form a second output from local oscillator 16. The beat frequency output from mixer 32 comprises echo pulses having an intermediate frequency characteristic which are then applied to intermediate frequency amplifier 34. The amplified output is then applied to limiter 36 which reduces the amplified signals to a predetermined level, said level being substantially equal to the amplitude of the reference oscillations from coho 20.

Although the signals entering limiter 36 have both amplitude and phase modulation, the limiter removes the amplitude modulation and thus provides, as an output, echo pulses having only phase modulation.

The limited signal issuing from limiter 36 is then applied simultaneously to detector or mixer 28 and detector or mixer 30. In said detectors, the limited signals are additively combined with the respective reference oscillations which are also applied to said detectors. The resultant combinations are detected therein to provide video signals. The amplitudes of these video signals are not necessarily the same but rather the signals from each detector have an amplitude dependent upon the phase angle between the incoming limited signal and the respective reference oscillations (which are 180° out of phase). The video output from detector 28 is applied by means of connection 38 to video subtractor 40. A second input to video subtractor 40 consists of the video output from detector 30 which is taken therefrom by means of connection 42. The video subtractor 40 may be merely the two load impedances of detectors 28 and 30 connected in opposition to give the difference between the output voltages of detectors 28 and 30. As the limited signals from limiter 36 are detected after being combined with the reference oscillations, the resultant video signals have no phase significance but have only an amplitude significance, hence they are scalar quantities. The two inputs to video subtractor 40 are subtracted therein and the output therefrom consists of a video pulse having an amplitude substantially equal to the difference in amplitude between the two input pulses simultaneously applied thereto. A pair of detectors such as 28 and 30 having a carrier impressed thereon in opposite phases and a carrier impressed on both detectors in the same phase and having the outputs in opposition are known as balanced detectors. Balanced detectors are used for various purposes and one example of such a circuit is shown on page 241 of "Radar System Fundamentals," published by the Government Printing Office.

Figure 2:
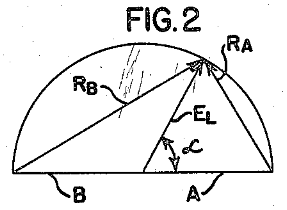
Fig. 2 is a vector diagram illustrating the phase relationship between certain signals.

The output from video subtractor 40 may be taken by means of connection 44 to moving object selector 46, also known as a cancellation circuit. Selector 46 distinguishes between the character of video pulses representing stationary objects and those representing moving objects. In accomplishing this, selector 46 detects the amplitude difference between successive video pulses which are applied thereto. The selector circuit may be of the type shown in Figure 5 of Patent No. 2,422,135. As the amplitude of video pulses representing moving objects has a relatively large variation from pulse to pulse the selector provides relatively large signals which are applied to indicator 48 where they manifest moving objects. On the other hand, video pulses manifesting fixed objects are substantially non-varying in amplitude and provide no output from the selector. Actually, however, due to the heretofore mentioned undesired fluctuations of certain stationary object video pulses, a small signal is passed by the selector, but as the limiting receiver reduces these fluctuations to a predeterminable value (substantially equal to noise) they are not perceived on the indicator. Reference is made to Fig. 2 which shows a vector representation of certain signals present in the receiver of Fig. 1. In the figure, vectors A and B represent the reference oscillations applied to detectors 28 and 30 (Fig. 1) respectively, said vectors being 180° out of phase with respect to one another. The limited signal which forms an output from limiter 36 of Fig. 1 is represented as $E_L$ and the resultant signals obtained by combining $E_L$ with the respective reference oscillations are represented as $R_A$ and $R_B$ respectively.

The amplitude of the resultant signals may be determined mathematically by the following trigonometric expressions which are apparent from Fig. 2.

(1) $$R_A=2E_L \sin\frac{\alpha}{2}$$

(2) $$R_B=2E_L \cos\frac{\alpha}{2}$$

where $\alpha$ is the phase angle between the limited signal $E_L$ and the reference oscillations.

Difficulties encountered by combining limited signals with one set of reference oscillations only (as in prior limiting receivers) may be more fully understood by considering the results of combining $E_L$ with reference oscillations B. Due to the fact that the amplitude of the resultant signal $R_B$ is a function of the phase angle $\alpha$, so called blind spots occur.

The reason for these blind spots may be best understood when it is realized that the output signal from selector 46, shown in Fig. 1, is proportional to the difference in amplitude of successive video pulses and not to the amplitude of the pulses themselves. Generally speaking, in the instance of echo pulses received from moving objects, the differences between successive video pulses applied to the selector are relatively large, i. e., the rate of amplitude change of the resultant signal is quite large.

When an aircraft (or other moving vehicle) is moving at a so-called blind speed, the phase angle between the majority of the successive echo pulses and the reference oscillations is such that the change in amplitude from pulse to pulse, of the signal applied to the selector is small. As a result the output from the selector may be so small as to be below the noise level of the receiver.

Most instances of blindness occur when the signal from an aircraft is superimposed on the signal from fixed objects such as clumps of trees, hills, etc., which are at substantially the same range as an aircraft. As an aid in understanding this concept, reference is made to Fig. 3. In the figure, vector 1 represents a signal from a relatively large stationary object and vector 3 represents a smaller signal from an aircraft (or other moving object) at substantially the same range. The signal actually received at the radio object locating system is the resultant of the two and is represented by vector 5. It is evident from the figure that although the signal from the aircraft, as represented by vector 3, varies in phase through full cycles of 360° ($2\pi$) the resultant signal has only a small incremental phase change, said phase change being represented as $d\alpha$. Where it is understood that $\alpha$ is the phase angle between the received signal and the reference oscillations. Now if $\alpha$ is in a blind region and $d\alpha$ is small, it is evident that the overall signal including that from the aircraft is likewise in a blind region.

Having explained how signals from moving objects, when superimposed on large fixed object signals result in a signal having only small changes in phase angle, reference to Fig. 4 will show why certain phase angles are called blind regions and cause a resultant loss of signal. Fig. 4a shows a graph of expression (2) where $R_B$ is plotted as the ordinate and $\alpha$ as the abscissa. It can be seen from this curve that when $\alpha$ is equal to even multiples of $\pi$, the signal $R_B$ is a maximum. However, the slope of this curve is zero at these points, and in fact, for a region on either side of the points zero slope (either side of 0, $2\pi$, $4\pi$, etc.), the slope is small. In other words, for a certain range of phase angles, rate of change of the resultant signal from the selector which may be designated as R is small, i. e.

$$\frac{dR}{d\alpha}$$

is small.

Figure 3:
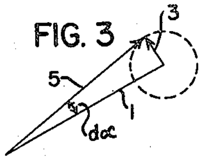
Fig. 3 is a vector diagram illustrating a moving object signal combined with a fixed object signal at substantially the same range.

In view of the preceding discussion in connection with Fig. 3, it is evident that echo signals indicating certain moving objects have but a small change in phase, said phase change being equal to $d\alpha$. It is further obvious that if the phase angle $\alpha$ of the signal with respect to the reference oscillations is in the region of 0, $2\pi$, $4\pi$, etc., the rate of change of the video signal $R_B$ is small and indeed the difference in amplitude between successive video pulses is likewise small. The effect of this is that a moving object represented by echo pulses having a phase angle in this region might not be perceived on the cathode ray indicator inasmuch as the small pulse to pulse change in amplitude results in a small signal output from the selector. In fact, if this signal is below the noise level of the system, such moving objects would not be seen on the indicator and hence it can be said that for certain phase angles, there are intervals of blindness.

It should be evident from the foregoing discussion that if $$\frac{dR}{d\alpha}$$

can be made large for all values of $\alpha$, the pulse to pulse difference in amplitude is large and such blind spots would not exist. Thus moving objects would be detected regardless of the phase angle between incoming signals and the reference oscillations.

Echo pulses from stationary objects have a small amount of amplitude modulation as heretofore described. This modulation is undesired and is reduced in amplitude as heretofore described, so that it does not exceed a certain value. For convenience, said value may be designated as $\Delta R$. In operation, the noise level of the receiver is adjusted so that it is substantially equal to $\Delta R$. Thus, moving objects are detected only if their amplitude modulation exceeds this value.

In view of the foregoing description, it can be seen that in the intervals of blindness, echo pulses from moving objects may, in said regions, have an amplitude variation from pulse to pulse which is less than $\Delta R$ and hence are lost. The circuit of Fig. 1 provides a means whereby the rate of change of amplitude of echo pulses from moving objects is great enough for all values of $\alpha$ so that the difference between successive echo pulses manifesting moving objects nearly always exceeds $\Delta R$. The operation of the circuit may be more readily understood by further reference to Fig. 4 which graphically shows the variation with $\alpha$ of certain signals appearing in the circuit of Fig. 2.

Figure 4A:
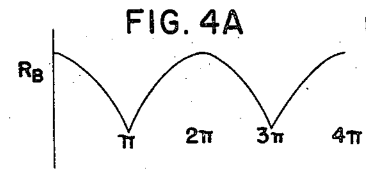
Figs. 4A to 4E are graphical illustrations of the characteristics of the vectors shown in Fig. 2.
Figure 4B:
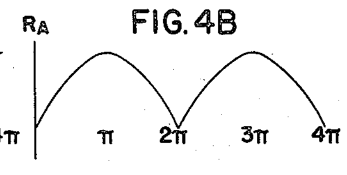
Figures 4C, 4D:
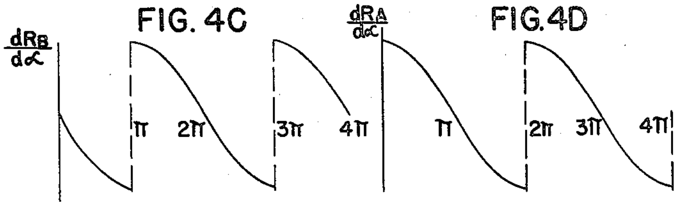

As heretofore mentioned, Fig. 4a is a plot of expression 2 which shows a variation of $R_B$ with $\alpha$. Fig. 4b is similar to 4a but shows the variations of $R_A$ with respect to $\alpha$ where it is to be understood that $R_B$ is the resultant signal obtained by combining the limited signal with one set of reference oscillations (B) and $R_A$ is the result of combining $E_L$ with the second set of reference oscillations (A). Fig. 4c shows the rate of change of $R_B$ with respect to $\alpha$, $$\frac{dR_B}{d\alpha}$$

It can be seen that at $\alpha=0$, $2\pi$, $4\pi$, etc., the rate of change of $R_B$ with respect to $\alpha$ is 0 and when $\alpha$ is slightly more or less than these values, $$\frac{dR_B}{d\alpha}$$

is still small. Thus, in the regions of $\alpha=0$, $2\pi$, $4\pi$, etc., the change in amplitude from pulse to pulse is quite small whenever a vehicle is moving at a blind speed, or when the signal from an aircraft (or other moving vehicle) is superimposed on a fixed object echo signal having a phase angle in these regions. In fact, the difference between successive pulses may be such that it does not exceed the undesired fluctuation value $\Delta R$ heretofore mentioned. Thus moving object echo pulses having phase angles in this region may not provide an indication of said objects.

Fig. 4d shows the rate of change of $R_A$ with respect to $\alpha$ $$\left(\frac{dR_A}{d\alpha}\right)$$

and is similar in character to Fig. 4c. However, in this latter instance (4d), the regions of blindness occur in the region of $\alpha=\pi$, $3\pi$, etc. A discontinuity exists at $\alpha=2\pi$. This merely means that the rate of change of $R_A$ with respect to $\alpha$ goes from a large negative value to a large positive value and the video pulses applied to the selector still have a rapid rate of change thereby providing a large signal out of the selector. Similar discontinuities also occur in the graph of Fig. 4c.

As the video signal representing $R_A$ and $R_B$ are detected, they lose their phase significance and remain only as scalar quantities. Thus, when they are combined in video subtractor 40 of Fig. 1, the resultant output therefrom consists of video signals equal to the absolute difference of $R_A$ and $R_B$. This resultant signal may be designated as R, and it can be shown that $$\frac{dR}{d\alpha}$$

is a large value for all values of $\alpha$, as follows:

$$R=|R_A|-|R_B|$$

therefore $$\frac{dR}{d\alpha}=\frac{d|R_A|}{d\alpha}-\frac{d|R_B|}{d\alpha}$$

Figure 4E:
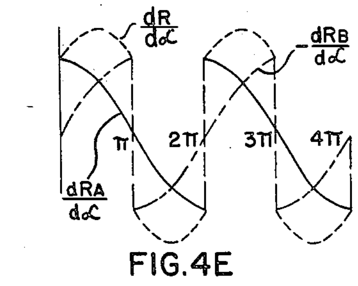

This expression is shown graphically in Fig. 4e where $$\frac{dR}{d\alpha}=\frac{d|R_A|}{d\alpha}-\frac{d|R_B|}{d\alpha}$$

In Fig. 4e, $$\frac{dR_A}{d\alpha}, \text{ and } \frac{dR_B}{d\alpha}$$

are drawn on the same abscissa. It is seen from the figure that the resultant curve $$\frac{dR}{d\alpha}$$

is a large positive value from $\alpha=0$ to $\pi$. Thus, for that region of $\alpha$, R changes rapidly with the phase angle and there is a large pulse to pulse difference in amplitude for echo pulses manifesting moving objects. At $\alpha=\pi$, there is a discontinuity and $$\frac{dR}{d\alpha}$$

suddenly becomes a large negative value. This has no effect on the video signal as the rate of change of R with respect to $\alpha$ is still large, which means there is still a large pulse to pulse difference in amplitude. It is thus evident from Fig. 4e that the rate of change of R with respect to $\alpha$ is always great and never reaches zero. As a result, the phase angle region which causes blindness is substantially reduced.

Figure 5:
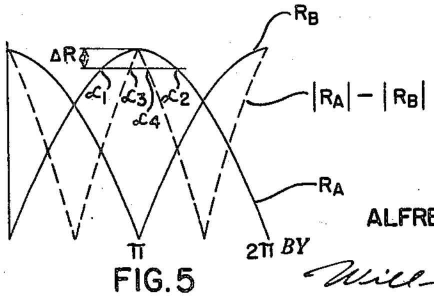
Fig. 5 is a graphical illustration showing certain advantages of the present invention.

Further understanding of the advantages of the present invention may be had by reference to Fig. 5. In the figure, the functions of $R_A$ and $R_B$ (as shown in Figs. 4a and 4b) are replotted so as to have common abscissae, and the dashed line curve shows the absolute difference $|R_A|-|R_B|$ between the two. The increment $\Delta R$ is arbitrarily chosen to represent the amount of undesirable fluctuation superimposed on fixed object echoes. As heretofore described, the receiver is adjusted so that the noise level is substantially equal to $\Delta R$. Thus, signal variations which are less than $\Delta R$ are not perceived on the video indicator.

It is evident from the figure ($R_A$ curve) that when $\alpha$ is greater than $\alpha_1$, but is less than $\alpha_2$, the amplitude fluctuations from pulse to pulse of $R_A$ is less than $\Delta R$. This means that the pulse to pulse change in the amplitude of the signals applied to the selector are less than $\Delta R$ and thus, signals from certain moving objects are not seen on the indicator. On the other hand, in the present invention, the signal applied to the selector is not $R_A$ or $R_B$ alone but rather is equal to the absolute difference between the two $|R_A|-|R_B|$. The graph of this function is shown in dashed line in Fig. 5. It is evident that the region of blindness is now much smaller and occurs only when the phase angle is between $\alpha_3$ and $\alpha_4$. In actual practice, the region $\alpha_3$ to $\alpha_4$ may be very small and as a result, substantially all blind spots are eliminated from the receiver.

In view of the foregoing, it is apparent that a radio object locating system of the character described is best able to distinguish fixed objects from moving objects when it employs a receiver having a particular response characteristic. This characteristic should be such that signals having a cyclical variation in amplitude are modified so that the change of rate of amplitude is always greater than zero. Such a characteristic may have the general shape of $|R_A|-|R_B|$ as shown in Fig. 5.

While there has been here described one embodiment of the present invention, it will be manifest to those skilled in the art that various changes and modfications may be made therein without departing from the invention. It is therefore aimed in the appended claims to cover all such changes and modifications as fall within the spirit and scope of the invention.

What is claimed is:

1. In a radio object locating system which transmits exploratory pulses of radiant energy and receives corresponding echo pulses, a receiver for said echo pulses, means for applying said echo pulses thereto, said receiver including means for limiting to a predetermined amplitude echo pulses that have an amplitude greater than said predetermined amplitude, means for generating first reference oscillations having a fixed phase relationship with each exploratory pulse, means for generating second reference oscillations having a fixed phase relationship with each exploratory pulse, said second reference oscillations being substantially 180° out of phase with said first reference oscillations, means for combining in an additive manner the limited echo pulses with said first reference oscillations, detecting means for obtaining first pulses from said combination, means for combining in an additive manner said limited echo pulses with said second reference oscillations, means for obtaining second pulses from said second combination, means for combining said first pulses and said second pulses to obtain output pulse signals having an amplitude substantially proportional to the difference in amplitude between said first pulses and said second pulses, whereby the characteristic of said receiver is such that received first and second pulses having a cyclical variation in amplitude are modified so that the rate of change of amplitude of the output pulse signals is always substantially greater than zero.

2. A receiver, means for applying pulse echo carrier frequency signals of radiant energy thereto, said receiver including means for limiting to a predetermined amplitude signals having an amplitude greater than said predetermined amplitude, whereby said limited signals have only phase modulation of the carrier frequency, means for generating a first reference signal having a frequency substantally equal to the carrier frequency of said limited signals, means for generating a second reference signal having a frequency substantially equal to the carrier frequency of said limited signals, said second reference signal being substantially 180° out of phase with said first reference signal, means for combining in an additive manner said first reference signal and said limited signals to obtain a first resultant combination, means for detecting said first combination to obtain first pulse signals, means for combining in an additive manner said second reference signal and said limited signals to obtain a second resultant combination, means for detecting said second resultant combination to obtain second pulse signals, means for combining said first pulse signals and said second video signals to obtain an output signal substantially proportional to the difference in amplitude between said first pulse signals and said second pulse signals, and means for indicating the amplitude variations of said output signal whereby the characteristic of said receiver is such that first and second signals having a cyclical variation in amplitude are modified so that the rate of change of amplitude of said output signal is always substantially greater than zero.

3. A receiver, means for applying pulse echo carrier frequency signals of radiant energy thereto, said receiver including means for limiting to a predetermined amplitude signals having an amplitude greater than said predetermined amplitude, whereby said limited signals have only phase modulation of the carrier frequency, means for generating a first reference signal having a frequency substantially equal to the carrier frequency of said limited signals, means for generating a second reference signal having a frequency substantially equal to the carrier frequency of said limited signals, said second reference signal being out of phase with said first reference signal, means for combining said first reference signal and said limited signals to obtain first pulse signals, means for combining said second reference signal and said limited signals to obtain second pulse signals, means for obtaining an output signal substantially proportional to the difference in amplitude between said first pulse signals and said second pulse signals, whereby the characteristic of said receiver is such that first and second pulse signals having a cyclical variation in amplitude are modified so that the rate of change of amplitude of said output signal is always substantially greater than zero.

4. In a radio object locating system which transmits exploratory pulses of radiant energy and receives corresponding echo pulses, a receiver for said echo pulses, said receiver including means for limiting to a predetermined amplitude echo pulses that have an amplitude greater than said predetermined amplitude, whereby the carrier frequency of said limited signals is phase modulated only, a first means for converting said phase modulated, limited amplitude pulses into output pulses having a first amplitude modulation, a second means for converting said phase modulated, limited amplitude pulses into output pulses having a second amplitude modulation different from the first amplitude modulation, and means for combining the output pulses having first and second amplitude modulations to produce resultant output pulses having a rate of change of amplitude with respect to the phase between the exploratory pulses and the respective echo pulses which is always appreciably greater than zero.

5. In a radar system which transmits exploratory pulses of carrier frequency energy and receives corresponding echo pulses, a receiver for receiving said echo pulses and selecting echo pulses received from moving targets, said receiver including means for limiting to a predetermined amplitude echo pulses having an amplitude greater than said predetermined amplitude, means for generating first and second reference oscillation having a fixed phase relationship with the carrier frequency of each exploratory pulse, means for combining in an additive manner the amplitude limited echo pulses with said first reference oscillations, detecting means for obtaining first pulses from said combination, means for shifting the phase of the carrier of said amplitude limited echo pulses with respect to said second reference oscillations and combining said amplitude limited echo pulses with said second reference oscillations in an additive manner, means for obtaining second pulses from said last named combination, means for combining said first pulses and said second pulses to obtain output pulse signals having an amplitude substantially proportional to the difference in amplitude between said first pulses and said second pulses, whereby the characteristic of said receiver is such that received first and second pulses having a cyclical variation in amplitude are modified so that the rate of change of amplitude of said output pulse signals is always substantially greater than zero.

6. In a radar system which transmits exploratory pulses of carrier frequency and receives corresponding echo pulses, a receiver for receiving said echo pulses and selecting echo pulses received from moving targets, said receiver including means for reducing the carrier frequency of the received echo pulses to an intermediate frequency, means for limiting to a predetermined amplitude echo pulses having an amplitude greater than said predetermined amplitude, means for generating first and second reference oscillations having a fixed phase relationship with the carrier frequency of each exploratory pulse, means for reducing the frequency of said reference oscillations substantially to said intermediate frequency, means for combining in an additive manner the intermediate frequency echo pulses with said first reduced frequency reference oscillations, detecting means for obtaining first pulses from said combination, means for changing the phase of the carrier of said amplitude limited echo pulses with respect to said second reduced frequency reference oscillations by 180 degrees and combining said amplitude limited echo pulses with said second oscillations in an additive manner, means for obtaining second pulses from said last named combination, means for combining said first pulses and said second pulses to obtain output pulse signals having an amplitude substantially proportional to the difference in amplitude between said first pulses and said second pulses, whereby the characteristic of said receiver is such that received first and second pulses having a cyclical variation in amplitude are modified so that the rate of change of amplitude of said output pulse signals is always substantially greater than zero.

ALFRED G. EMSLIE.

REFERENCES CITED

The following references are of record in the file of this patent:

UNITED STATES PATENTS

| Number | Name | Date |
|---|---|---|
| 2,113,214 | Luck | Apr. 5, 1938 |
| 2,406,019 | Labin | Aug. 20, 1942 |